United States Patent [19]

Winand

[11] 4,157,285

[45] Jun. 5, 1979

[54] METHOD FOR PREPARING MANGANESE CHLORIDE AND MANGANESE BY IGNEOUS ELECTROLYSIS OF THE MANGANESE CHLORIDE OBTAINED

[75] Inventor: Rene F. P. Winand, Rixensart, Belgium

[73] Assignee: Universite Libre De Bruxelles, Brussels, Belgium

[21] Appl. No.: 808,179

[22] Filed: Jun. 20, 1977

Related U.S. Application Data

[63] Continuation of Ser. No. 690,433, May 27, 1976, abandoned.

[30] Foreign Application Priority Data

May 27, 1975 [BE] Belgium ................................ 829553

[51] Int. Cl.$^2$ .............................................. C25C 3/00
[52] U.S. Cl. ................................................. 204/64 R
[58] Field of Search ..................... 204/64 R; 75/63, 80

[56] References Cited

U.S. PATENT DOCUMENTS

| | | | |
|---|---|---|---|
| 704,393 | 7/1902 | Simon | 204/64 R |
| 2,302,604 | 11/1942 | Dolbear | 204/64 R |
| 3,894,927 | 7/1975 | Kane et al. | 204/64 R |

*Primary Examiner*—Howard S. Williams
*Attorney, Agent, or Firm*—Scully, Scott, Murphy & Presser

[57] ABSTRACT

Manganese is recovered from its oxides by reacting a manganese oxide with fused calcium chloride or fused magnesium chloride to provide a liquid phase containing manganese chloride and fused chloride, and a solid phase containing reaction residue, the temperature of the reaction being above the melting point of the calcium or magnesium chloride but below the boiling point of manganese chloride in the reaction mixture. The liquid phase containing the manganese chloride is then subjected to electrolysis to deposit manganese metal upon the cathode and release elemental chlorine at the anode.

12 Claims, No Drawings

METHOD FOR PREPARING MANGANESE CHLORIDE AND MANGANESE BY IGNEOUS ELECTROLYSIS OF THE MANGANESE CHLORIDE OBTAINED

This is a continuation of application Ser. No. 690,433, filed May 27, 1976, now abandoned.

This invention has for object a method for preparing manganese chloride from at least one oxidized manganese compound.

This method is particularly useful for elaborating metal manganese with more than 95% maganese by igneous electrolysis.

It is known in the present art, as described in the following disclosures: A. H. SULLY—Manganese—Butterworths—London (1955), Ullmans Encyklopädie der Technischen Chemie—Band 12—Urban und Schwartzenberg—Munchen—(1960), DURRER/VOLKERT—Mettalurgie der Ferrolegierungen-Springer Verlag Berlin (1972), to elaborate the metal manganese by silicothermic or aluminothermic reduction of oxidized manganese compounds, by electrolysis in aqueous sulfuric solution (R. S. DEAN-Electrolytic Manganese and its Alloys—The Ronald Press Company—New-York—1952) or in aqueous hydrochloric solution (J. H. JACOBS and P. E. CHURCHWARD Trans. Electrochem. Soc. 94 (1948) 108-121), by electrolysis of oxidized manganese compounds dissolved in calcium fluoride (U.S. Pat. No. 3,018,233) or by electrolysis of molten oxide mixtures (Belgian Pat. No. 683,660). Many works show moreover that it is easy to obtain manganese at the cathode of an electrolysis cell operating with molten chloride baths in which the manganese is present as manganous chloride $MnCl_2$ (U.S. Pat. Nos. 2,752,299; 2,752,303; 2,877,110; 3,024,106; Brit. Pat. 880,017).

It thus became clear that the manganous chloride could form an attractive raw material for the preparation of metal manganese by electrolysis as long as it is possible to obtain an electrolyte containing manganous chloride under attractive cost conditions.

For instance to elaborate manganous chloride, many writers have studied the chlorinating of oxidized manganese compounds by chlorine gas and by hydrochloric acid gas: U.S. Pat. No. 2,752,299; Brit. Pat. No. 880,017; G. Pat. No. 1,106,622; Y. OKAHARA and I. IWASAKI—Trans. AIME 247 (1970) 73-80; B. T. MAC MILLAN and T. L. TURNER—U.S. Bureau of Mines R.I. 5082 (1954) and 5281 (1954); A. A. COCHRAN and W. L. FALKE—J. of Metals-(1967) 28-32—U.S. Bureau of Mines R.I. 6859 (1967); H. HOHN, B. JANGG, L. PUTZ and E. SCHMILD, Progress in Mineral Dressing—Ed. Almgvistand Wiskell (Sweden) (1958) 683-703—Y. G. BUCHU—KURI and M. I. MEHEDLISHVILI Soobshch. Akad. Nauk. Gruz. S.S.R. 56 (2) (1970) 349-352).

Such a chlorinating reaction leads either to volatilizing the manganous chloride which is thereafter condensed, or to the forming of a chlorinated mass obtained with said reaction and containing said manganous chloride, which manganous chloride can be separated by aqueous lixiviating. In the latter case, the manganous chloride is crystallized by evaporating the water from the aqueous solution and thereafter it is dehydrate by heating.

Said elaborating methods have however many drawbacks which are notably associated with the treatment installations being corroded by the chlorine or hydrochloric acid, with the problems for condensing chloride gases or with the difficulty for dehydrating the manganous chloride without contaminating same with oxides or hydroxides.

Still another method lies in performing the volatilizing chlorinating of manganese from oxidized manganese compounds by making use of calcium chloride as chlorinating agent, as described by MAC MILLAN and TURNER (U.S. Bureau of Mines R.I. 5082 (1954) and 5281 (1954) above), and A. BOYADZHIEV (Minne Delo Met. (Sofia) 18 (7) (1963) 29-33).

A technical and economical study of this latter method shows that even if it is easier to perform than chlorinating with chlorine gas or hydrochloric acid gas due to the better behaving of the installations relative to corrosion, it is however required to use a very high flow rate of carrier gas to insure a high enough productivity on an industrial scale, and the condensing of $MnCl_2$ vapour even if it is possible causes technological problems which are difficult to solve to obtain satisfactory condensing throughputs.

The object of the invention is to provide a new method for preparing manganese chloride from oxidized manganese compounds, particularly the preparation of an electrolyte for the igneous electrolysis used to produce manganese chloride, method with which it is possible to obviate the drawbacks of the above-described known methods.

For this purpose according to the invention, the oxidized manganese compound is lixiviated with at least one chloride selected in the group formed by the calcium chloride and the magnesium chloride, so as to obtain by the reaction of the oxidized compound with said chloride, the manganese chloride in the liquid form.

Advantageously the oxidized manganese compound is lixiviated with a molten salt bath that contains besides one compound selected in the group formed by the calcium chloride and the magnesium chloride, alkaline and alkaline-earth chlorides other than the ones mentioned above.

Other details and features of the invention will stand out from the description given below by way of non limitative example, of some embodiments of the invention.

The method according to the invention lies essentially in the lixiviating of the oxidized manganese compounds with calcium dichloride, magnesium dichloride or mixtures of alkaline or alkaline-earth chlorides that contain at least one of both said chlorides so as to elaborate directly manganous chloride in liquid form, in solution in a molten salt bath. Thus the problem associated with the volatilizing and condensing of the manganous chloride as in the known art, is avoided.

It has been noticed according to the invention that it is easily possible to separate by decanting and filtering, the solid residue obtained by reacting calcium chloride and/or magnesium chloride with oxidized manganese compounds from the molten chloride bath formed so as to obtain directly an electrolyte which after puryfying, for example by a pre-electrolysis under low voltage or by a treatment with crushed ferro-manganese as described in another patent in the name of the Inventor, could be subjected to electrolysis for elaborating metal manganese.

Advantageously in the method according to the invention, the chlorine contained in the calcium chloride or magnesium chloride used for lixiviating and released at the electrolysis cell anode can be recovered and commercialized. This is a remarkable advantage relative to the known methods for chlorinating with chlorine gas or hydrochloric acid gas.

The oxidized manganese compounds to be reacted with the calcium chloride and/or magnesium chloride are manganous oxide, manganese carbonate, higher oxides such as $Mn_3O_4$, $Mn_2O_3$ or $MnO_2$, hydrated, carbonated, siliceous or oxidized manganese ores, or else metallurgy residues such as slag from Martin furnace, electric steel furnace or ferromanganese or silicomanganese-elaborating furnace, that is any material containing manganese combined with oxygen.

In a particularly advantageous embodiment, use is made as oxidized manganese compound, of a compound in which the manganese is bivalent; under such conditions, said oxidized compound is comprised of manganese carbonate, it is not required to decompose same before performing thereon the chlorinating; the decomposition may indeed occur together with the chlorinating.

On the other hand, if the manganese present in the oxidized compound to be treated has a valence higher than two, it might be advantageous but not indispensable to perform a previous reduction of the oxidized manganese compound down to valence two for example by means of carbon monoxide, hydrogen or carbon, or to perform the chlorinating in a reducing atmosphere in the presence of a solid reducing agent such as carbon.

In a preferred embodiment of the invention, silica, alumina or a mixture of both said materials is added to the oxidized manganese compound to be chlorinated, so as to form silicates, aluminates or silico-aluminates together with the calcium or magnesium oxides produced by the chlorinating reaction. Under such conditions, the temperature to be reached for the lixiviation may be lower by a hundred Celsius degrees relative to that temperature which would be required in the absence of silica or alumina to obtain the same manganous chloride concentration in the molten salt bath.

It is clear that the silica or alumina could also be part of the oxidized manganese compound to be chlorinated, which would be the case for slag or ore for example.

Moreover in some cases to lower the melting point of the electrolyte, to lower the vapour pressure or to influence the thermodynamic action of one component in the molten salt bath before or after the chlorinating reaction, it might be useful to add to the molten salts, small amounts of other haloids or oxides.

A practical example of a particular embodiment of the method according to the invention will be given hereinafter.

EXAMPLE.

Loads each comprising one mole MnO or $MnCO_3$ have been heated in the presence of one mole $CACl_2$ and one half mole $SiO_2$ under cover from air during one half hour at various temperatures. After decanting, it did appear that the overfleeting liquid phase comprising $MnCl_2$ and $CaCl_2$ had molar ratios $MnCl_2/CaCl_2$ from 0.2 to 0.8 when the reaction temperature is raised from 800° to 1000° C. The tests have shown that the reaction is very fast and that the balance appears to be reached. Moreover, the solid residue is easily decanted and the hot filtering does not cause any problem.

The elaborated $MnCl_2$—$CaCl_2$ mixture were suitable for a direct electrolysis which gave solid, powdery and dendritic manganese deposits. After melting said deposits, it was possible to obtain massive manganese metal with a purity better than 99.9% manganese.

It is to be noticed that the usable temperature range is very large, said temperature being limited on the one hand but by the melting temperature of the chloride mixture used for lixiviating and on the other hand but by the boiling point of the manganous chloride that lies at 1230° C. when it has a unit thermodynamic activity and a higher temperature when this thermodynamic activity is lower than a unit value. However due to kinetic reaction conditions on the one hand and to spare the energy required on the other hand, it has been noticed that temperatures lying between 300° and 1200° C. and preferably between 500° and 1100° C. allow to obtain valid industrial results.

The calcium chloride used can be a by-product of the Solvay method for elaborating sodium carbonate or it can originate from more complex salts extracted from underground rock-salt mines or salt-pans, or even from brine from sea-water unsalting installations after evaporating and dehydrating.

It must be understood that the invention is in no way limited to the above embodiments and that many changes can be brought therein without departing from the scope of the invention as defined by the appended claims.

I claim:

1. A method for recovering manganese which comprises:
   (a) reacting a manganese oxide with at least one fused chloride selected from the group consisting of calcium chloride and magnesium chloride to provide a liquid phase containing manganese chloride and fused chloride, and a solid phase containing reaction residue, the temperature of the reaction being at or above the melting point of the calcium or magnesium chloride but below the boiling point of manganese chloride in the reaction mixture; and
   (b) electrolyzing the liquid phase containing the manganese chloride to deposit manganese metal upon the cathode and release chlorine at the anode, said chlorine being recovered in elemental form.

2. The method of claim 1 wherein the manganese oxide is reacted with the calcium or magnesium chloride at a temperature of from about 300° C. to 1200° C.

3. The method of claim 2 wherein the manganese oxide is reacted with the calcium or magnesium chloride at a temperature of from about 500° C. to 1100° C.

4. The method of claim 1 wherein the fused calcium or magnesium chloride contains at least one other alkali metal chloride or alkaline earth metal chloride.

5. The method of claim 4 wherein following the reaction, the supernatant is decanted and filtered to remove solid reaction residues therein.

6. The method of claim 1 wherein following the reaction, compounds of metals nobler than manganese are removed from the fused reaction medium.

7. The method of claim 1 wherein the manganese oxide is selected from the group consisting of MnO, $Mn_3O_4$, $Mn_2O_3$, $MnO_2$, manganese carbonate, hydrated, carbonated or siliceous manganese oxide, and manganese oxide-containing slag.

8. The method of claim 7 wherein at least a part of the manganese oxide is an oxide in which the valence of manganese is greater than two and the reaction is carried out in the presence of a reducing agent.

9. The method of claim 8 wherein the reducing agent is selected from the group consisting of carbon monoxide, hydrogen and carbon.

10. The method of claim 7 wherein at least a part of the manganese oxide is an oxide in which the valence of manganese is greater than two, said oxide being reacted with a reducing agent prior to the reaction with calcium or magnesium chloride until the manganese present in substantially all of the oxide has a valence of two.

11. The method of claim 1 wherein prior to the reaction, at least one compound selected from the group consisting of silica and alumina is present in the reaction mixture.

12. The method of claim 1 wherein the manganese metal is melted and the molten metal is removed from the cathode.

* * * * *